US012228090B1

(12) United States Patent
Ives et al.

(10) Patent No.: US 12,228,090 B1
(45) Date of Patent: Feb. 18, 2025

(54) SYSTEM AND METHOD TO REDUCE FUEL CUT ENRICHMENT NOX EMISSIONS

(71) Applicant: FCA US LLC, Auburn Hills, MI (US)

(72) Inventors: Mark E Ives, LaSalle (CA); Kevin L Mason, Farmington Hills, MI (US); Justin Neufeld, Cottam (CA); Simon O Omekanda, Oakland Township, MI (US); Muhammad Rizwan S Khan, Canton, MI (US)

(73) Assignee: FCA US LLC, Auburn Hills, MI (US)

(*) Notice: Subject to any disclaimer, the term of this patent is extended or adjusted under 35 U.S.C. 154(b) by 0 days.

(21) Appl. No.: 18/526,002

(22) Filed: Dec. 1, 2023

(51) Int. Cl.
*F02D 43/04* (2006.01)
*F02D 41/24* (2006.01)

(52) U.S. Cl.
CPC ......... *F02D 43/04* (2013.01); *F02D 41/2422* (2013.01); *F02D 2200/0614* (2013.01); *F02D 2200/08* (2013.01); *F02D 2250/36* (2013.01)

(58) Field of Classification Search
CPC ................. F02D 43/04; F02D 41/2422; F02D 2200/0614; F02D 2200/08; F02D 2250/36
See application file for complete search history.

(56) References Cited

U.S. PATENT DOCUMENTS

| | | | | |
|---|---|---|---|---|
| 11,686,263 B1 * | 6/2023 | Magner | F01N 3/2073 60/274 |
| 2011/0036069 A1 * | 2/2011 | Hahn | F02D 41/1494 60/276 |
| 2023/0212994 A1 * | 7/2023 | Magner | F02D 41/0235 60/274 |

* cited by examiner

*Primary Examiner* — Joseph J Dallo
(74) *Attorney, Agent, or Firm* — Jeremy J. Klobucar

(57) ABSTRACT

An engine control system includes one or more oxygen (O2) sensors disposed proximate to a three-way catalytic converter (TWC) in an exhaust system of the vehicle, the one or more O2 sensors each configured to measure an O2 level of exhaust gas produced by the engine. A controller is in signal communication with the one or more O2 sensors and programmed to detect a fuel shut-off (FSO) event where the engine ceases providing fuel to the engine, determine an accumulated gas flow through the TWC during the FSO event, determine the FSO event has ended, initiate an open loop fuel enrichment mode where the engine is supplied with a first fuel enrichment level having a first rich fuel/air ratio, and subsequently initiate a closed loop fuel enrichment mode where the engine is supplied with a second fuel enrichment level having a second rich fuel/air ratio, to thereby reduce NOx emissions.

17 Claims, 3 Drawing Sheets

SYSTEM AND METHOD TO REDUCE FUEL CUT ENRICHMENT NOX EMISSIONS

FIELD

The present application relates generally to vehicle engine exhaust treatment systems and, more particularly, to vehicle engine exhaust treatment systems to reduce NOx emissions.

BACKGROUND

Catalysts are typically implemented in vehicle exhaust systems for treating exhaust gas produced by an internal combustion engine to mitigate or eliminate emissions. A three-way catalytic converter (TWC) is a specific type of catalyst that is typically implemented in exhaust systems of vehicles having stoichiometric burn engines. The TWC is configured to oxidize carbon monoxide (CO) and unburnt hydrocarbons (HC) to produce carbon dioxide (CO2) and water (H2O), as well as reduce nitrogen oxides (NOx) to nitrogen (N2). However, if the vehicle performs a fuel cut for example during deceleration, the TWC may become saturated with O2, which does not favor NOx reduction reaction. Thus, while such conventional systems work for their intended purpose, it is desirable to provide continuous improvement in the relevant art.

SUMMARY

In accordance with one example aspect of the invention, a control system for an engine of a vehicle is provided. In one example implementation, the control system includes one or more oxygen (O2) sensors disposed proximate to a three-way catalytic converter (TWC) in an exhaust system of the vehicle, the one or more O2 sensors each being configured to measure an O2 level of exhaust gas produced by the engine. A controller is in signal communication with the one or more O2 sensors and programmed to (i) detect a fuel shut-off (FSO) event where the engine ceases providing fuel to the engine, (ii) determine an accumulated gas flow through the TWC during the FSO event, (iii) determine the FSO event has ended, (iv) initiate an open loop fuel enrichment mode where the engine is supplied with a first fuel enrichment level having a first rich fuel/air ratio, and (v) subsequently initiate a closed loop fuel enrichment mode where the engine is supplied with a second fuel enrichment level having a second rich fuel/air ratio, to thereby reduce NOx emissions.

In addition to the foregoing, the described control system may include one or more of the following features: wherein the first rich fuel/air ratio is a set value, and wherein the second rich fuel/air ratio is adjusted to maintain a target fuel/air ratio; wherein the at least one O2 sensor includes a first O2 sensor and a second O2 sensor; and wherein the TWC includes a first catalyst disposed upstream of a second catalyst, and wherein the first O2 sensor is disposed upstream of the first catalyst, and the second O2 sensor is disposed downstream of the first catalyst and upstream of the second catalyst.

In addition to the foregoing, the described control system may include one or more of the following features: wherein the controller is further programmed to determine the first fuel enrichment level based on a lookup table of varying fuel enrichment levels as a function of the determined accumulated gas flow through the TWC during the FSO event; wherein the controller is further programmed to determine the second fuel enrichment level based on a lookup table of enriched target fuel/air ratio as a function of the determined accumulated gas flow through the TWC during the FSO event; and wherein the controller is configured to transition from the open loop fuel enrichment mode to the closed loop fuel enrichment mode when a voltage of the one or more O2 sensor exceeds a predetermined threshold voltage.

In addition to the foregoing, the described control system may include one or more of the following features: wherein the controller is configured to transition from the open loop fuel enrichment mode to the closed loop fuel enrichment mode when an accumulated gas flow through the TWC during the open loop fuel enrichment mode has exceeded a predetermined threshold; and wherein the controller is further programmed to cease the closed loop fuel enrichment mode when a gas flow through the TWC during the closed loop fuel enrichment mode meets or exceeds a flow threshold.

In accordance with another example aspect of the invention, method of performing a fuel enrichment event for an engine of a vehicle to reduce NOx emissions is provided. In one example implementation, the method includes providing a controller in signal communication with one or more oxygen (O2) sensors disposed proximate to a three-way catalytic converter (TWC) in an exhaust system of the vehicle, the one or more O2 sensors each being configured to measure an O2 level of exhaust gas produced by the engine; detecting, by the controller, a fuel shut-off (FSO) event where the engine ceases providing fuel to the engine; determining, by the controller, an accumulated gas flow through the TWC during the FSO event; determining, by the controller, the FSO event has ended; initiating, by the controller, an open loop fuel enrichment mode where the engine is supplied with a first fuel enrichment level having a first rich fuel/air ratio; and subsequently initiating a closed loop fuel enrichment mode where the engine is supplied with a second fuel enrichment level having a second rich fuel/air ratio, to thereby reduce NOx emissions.

In addition to the foregoing, the described method may include one or more of the following features: wherein the first rich fuel/air ratio is a set value, and wherein the second rich fuel/air ratio is adjusted to maintain a target fuel/air ratio; wherein the at least one O2 sensor includes a first O2 sensor and a second O2 sensor; wherein the TWC includes a first catalyst disposed upstream of a second catalyst, and wherein the first O2 sensor is disposed upstream of the first catalyst, and the second O2 sensor is disposed downstream of the first catalyst and upstream of the second catalyst; and determining, by the controller, the first fuel enrichment level based on a lookup table of varying fuel enrichment levels as a function of the determined accumulated gas flow through the TWC during the FSO event.

In addition to the foregoing, the described method may include one or more of the following features: determining, by the controller, the second fuel enrichment level based on a lookup table of enriched target fuel/air ratio as a function of the determined accumulated gas flow through the TWC during the FSO event; transitioning, by the controller, from the open loop fuel enrichment mode to the closed loop fuel enrichment mode when a voltage of the one or more O2 sensor exceeds a predetermined threshold voltage; transitioning, by the controller, from the open loop fuel enrichment mode to the closed loop fuel enrichment mode when an accumulated gas flow through the TWC during the open loop fuel enrichment mode has exceeded a predetermined threshold; and ceasing, by the controller, the closed loop fuel enrichment mode when a gas flow through the TWC during the closed loop fuel enrichment mode meets or exceeds a flow threshold.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
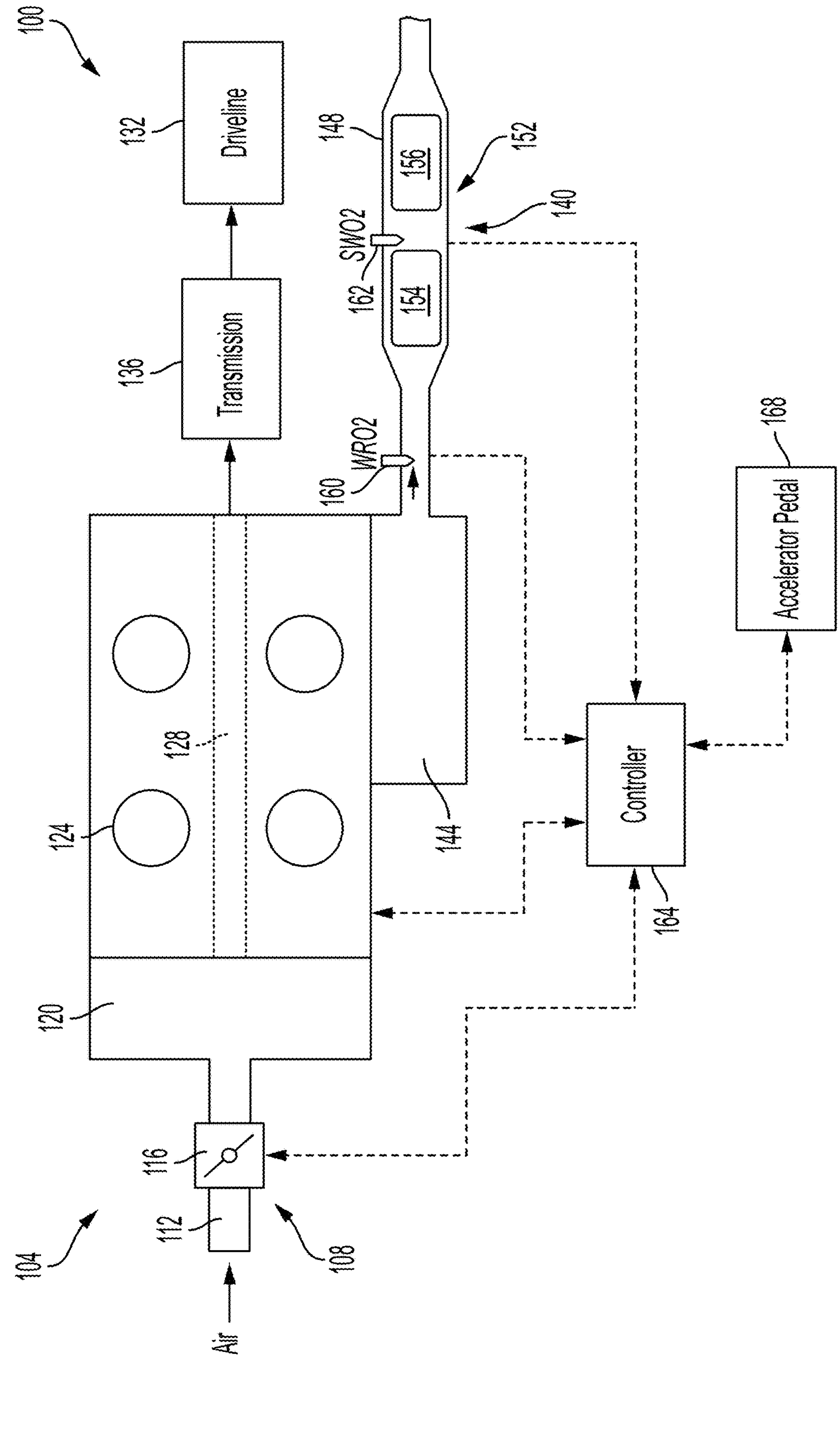
FIG. 1 is a schematic diagram of an example vehicle having a stoichiometric combustion engine and an exhaust system in accordance with the principles of the present application.

As previously mentioned, some vehicle exhaust systems include a three-way catalytic converter (TWC) to convert exhaust gas constituents such as carbon monoxide (CO), carbon dioxide (CO2), oxygen (O2), hydrocarbons (HC), and nitrogen oxides (NOx) to reduce emissions. Fuel cut or fuel shut-off (FSO) events, which typically occur during nearly closed throttle vehicle deceleration periods, involve operating the engine with a lean fuel/air ratio, which results in O2 accumulating in the TWC. Due to the accumulated O2, the FSO event may be followed by a fuel enrichment event, which involves operating the engine with a rich fuel/air ratio to increase CO and HC to react with the excess stored O2. Once the O2 level decreases, the engine returns to stoichiometric operation. However, if the excess oxygen is not fully depleted from the fuel cut event during the enrichment, the NOx production may potentially increase, and thus undesirable emissions may be generated.

Accordingly, the systems and methods described herein are configured to reduce fuel cut NOx emissions upon fuel enablement. To monitor FSO and enrichment events, the system includes an upstream O2 sensor and a downstream O2 sensor to monitor exhaust gas O2 concentration upstream and downstream (or mid-catalyst) of the TWC. Once an FSO event is initiated, a controller monitors the O2 sensors to determine the accumulated amount of unburned gas going through the TWC. Based on this amount, the controller initiates an open loop fueling mode with a predetermined rich air/fuel ratio to bring up the upstream O2 sensor reading. Once the downstream O2 sensor voltage rises above a predetermined threshold voltage or the accumulated flow reaches a predetermined threshold, the controller initiates a closed loop fueling mode with a targeted predetermined rich air/fuel ratio. In one example, closed loop refers to a feedback control system while open loop refers to a non-feedback control system. The enrichment ends when conditions are satisfied.

In one example, when an FSO event is initiated, fuel enrichment is needed to deplete the oxygen from the catalyst to restore the conversion efficiency. When fueling is re-enabled, the fuel enrichment first goes into an open loop fueling (EN1). This amount of fuel enrichment is determined based on the total accumulated flow of air into the catalyst while fuel is turned off. The open loop fueling is sustained until such time as either the downstream O2 sensor voltage rises above a threshold voltage or the accumulated flow (FL1) has reached an exit threshold amount. The accumulated flow FL1 is the integrated airflow while in the open loop fueling mode. The FL1 exit threshold amount indicates that both the upstream and downstream bricks of the catalyst are fully saturated with oxygen from the fuel cut event.

Following whichever exit case has occurred first during the open loop fueling, a closed loop extending fueling (EN2) is engaged. The EN2 enrichment amount is determined based on the total accumulated flow of air into the catalyst when the fuel was turned off and is engaged until such time as the integrated (accumulated) flow (FL2) has reached a predetermined threshold. The FL2 threshold is determined by the total accumulated flow of air into the catalyst when the fuel is turned off prior to the re-enablement of fuel. As such, the described operation extends enrichment for a calibratable amount of gas flow through the catalyst after applying closed loop fueling enrichment, which ensures the complete removal of excess oxygen in the rear brick of the catalyst regardless of the mid-brick oxygen sensor reading. The final tailpipe NOx is lowered due to the removal of excess oxygen from both catalyst bricks.

Referring now to FIG. 1, a diagram of an example vehicle 100 is illustrated. The vehicle 100 comprises a stoichiometric combustion engine 104 capable of operating with a rich fuel/air ratio. Non-limiting examples of a type of fuel that the engine 104 could utilize include gasoline, compressed natural gas (CNG), and liquefied natural gas (LNG). The engine 104 draws air through an induction system 108 comprising an induction passage 112, a throttle valve 116, and an intake manifold 120. The air in the intake manifold 120 is dispersed to cylinders 124 and combined with fuel to form a fuel/air mixture that is combusted (e.g., by spark plugs) within cylinders 124 to drive pistons (not shown) that rotatably turn a crankshaft 128 generating drive torque. While four cylinders are shown, it will be appreciated that the engine 104 could include any suitable number of cylinders (six, eight, etc.).

The drive torque is transferred to a driveline 132 via a transmission 136. It will be appreciated that the vehicle 100 could have a hybrid driveline where the drive torque generated by the engine 104 is transferred to an electric motor or generator instead of or in addition to the transmission 136. Exhaust gas resulting from combustion is expelled from the cylinders 124 into an exhaust system 140. The exhaust system 140 comprises an exhaust manifold 144, an exhaust passage 148, and a TWC 152 disposed along the exhaust passage 148 and configured to mitigate or eliminate CO, HC, and NOx in the exhaust gas.

The TWC 152 includes an upstream brick or catalyst 154 and a downstream brick or catalyst 156 for catalytic reactions. As previously discussed, the TWC 152 oxidizes the CO and HC (i.e., combines them with O2) to produce carbon dioxide (CO2) and water (H2O), and the TWC 152 reduces the NOx to nitrogen (N2) and O2. The exhaust system 140 further comprises an upstream exhaust gas O2 sensor 160 and a downstream exhaust gas O2 sensor 162. In the example embodiment, O2 sensor 160 is disposed upstream of the first catalyst 154, and the second O2 sensor 162 is disposed “mid-brick” between the first and second catalysts 154, 156. It will be appreciated that the techniques of the present disclosure could be achieved using only one of these sensors 160, 162 (e.g., to save costs). However, utilizing both of the sensors 160, 162 may increase the accuracy and/or robustness of the techniques.

It will be appreciated that the O2 sensors 160, 162 could be linear-type O2 sensors, switching-type O2 sensors, or some combination thereof. Whereas a switching-type O2 sensor switches its output in response to rich and lean fuel/air (FA) ratio transitions, a linear-type O2 sensor could output a voltage indicative of the FA ratio and thus this voltage could be monitored to determine when it passes through a voltage level associated with stoichiometry.

A controller 164 (e.g., ECU) controls operation of the engine 104, such as controlling airflow/fueling/spark to achieve a desired drive torque. This desired drive torque could be based, for example, on input provided by a driver of the vehicle 100 via an accelerator pedal 168. The controller 164 controls the engine 104 to perform fuel enrichment events (rich fuel/air ratio operation, such as for increased power or exhaust gas cooling) and fuel cutoff events (lean fuel/air ratio operation, such as no fuel being injected during pedal-off deceleration). The controller 164 also implements at least a portion of the techniques of the present disclosure, which are described in greater detail below with respect to FIG. 2.

Figure 2:
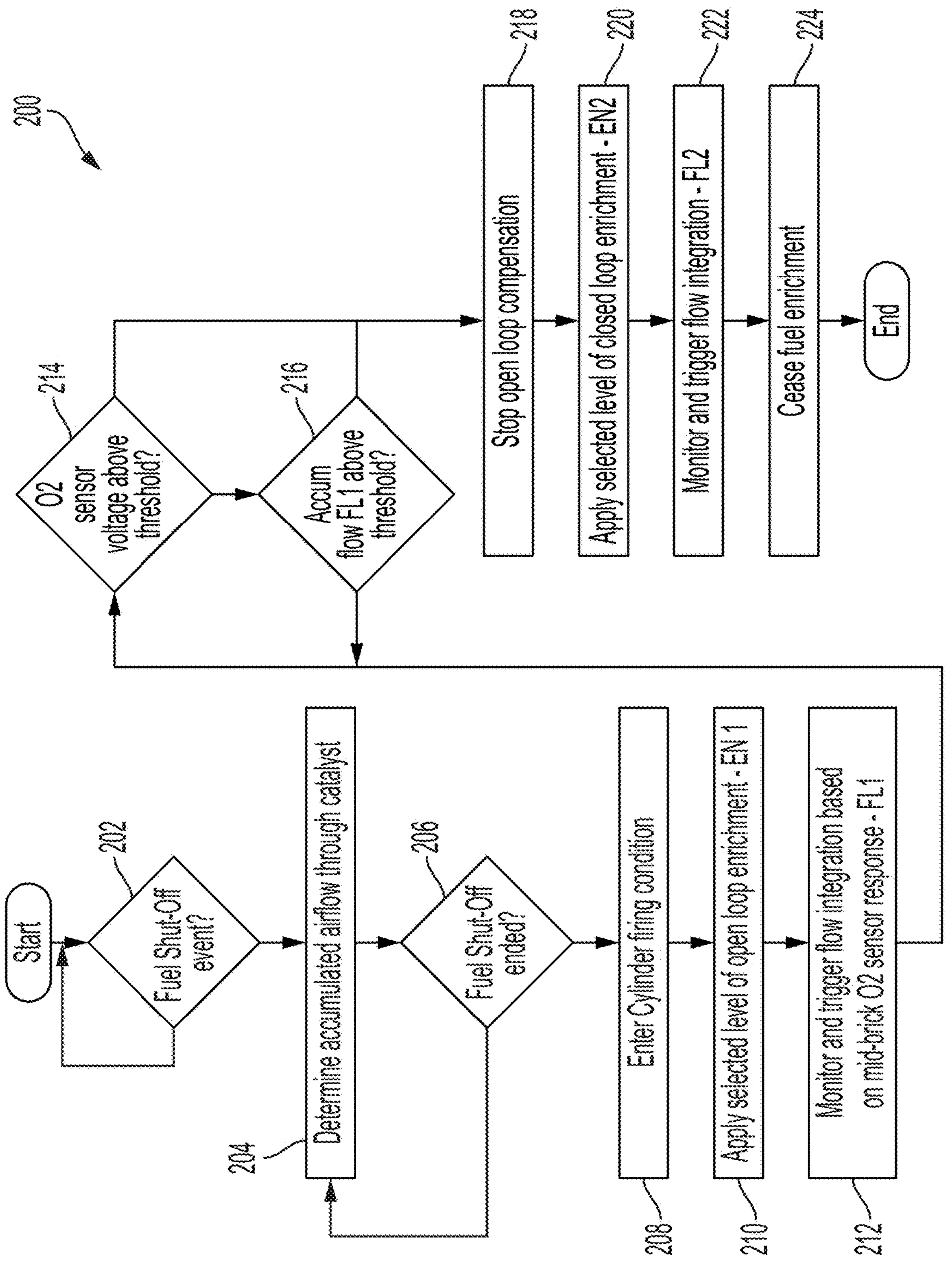
FIG. 2 is a flow diagram of an example method of enrichment upon reenabling fuel for reducing NOx emissions following a fuel cut, in accordance with the principles of the present application.

Referring now to FIG. 2, a flow diagram of an example method 200 of reducing NOx emissions following a fuel cut and enrichment is presented. At 202, controller 164 (e.g., control) determines if an FSO event has been initiated. If no, control returns to step 202. If yes, at step 204, controller 164 determines how much airflow is passing through the TWC 152 during the FSO event. In one example, the estimated airflow is model-based (stored in ECU 164) and depends at least in part on engine speed during the FSO event. The estimated airflow is integrated over the duration of the FSO event to determine an Integrated DFSO gas flow (e.g., in grams). At step 206, controller 164 determines whether the FSO event has ended. The FSO event may end, for example, when the driver presses the accelerator pedal 168. If no, controller 164 continues to measure the airflow through the TWC 152. If yes, at step 208, controller 164 initiates fuel flow and fires the cylinders 124.

At step 210, controller 164 enters the open loop enrichment mode and determines and applies a level of fuel enrichment to the TWC 152 to react with the excess O2 accumulated/stored in the TWC 152 during the FSO event. The level of fuel enrichment is based on the Integrated DFSO gas flow determined in step 204. As such, open loop enrichment mode selects a fuel/air ratio with a set value (e.g., for the entire open loop mode). In one example, the fuel enrichment is determined from a lookup table (e.g., stored in controller 164). An example lookup table is shown below (Table 1) where the amount of fuel enrichment, as a percentage above stoichiometric, is selected as a function of the accumulated gas flow (in grams) through the TWC 152 during the FSO event. For example, as shown in Table 1, if the determined Integrated DFSO gas flow is 0.5 g, then controller 164 determines that a fuel enrichment level of 10% should be applied to the exhaust flow based on the lookup table.

TABLE 1

| | | | | | |
|---|---|---|---|---|---|
| X - Integrated DFSO gas flow (g) | 0.1 | 0.5 | 3 | 6 | 10 |
| Y - Fuel Enrichment (%) | 5 | 10 | 15 | 20 | 20 |

At step 212, controller 164 determines the accumulated airflow FL1 passing through the TWC 152 during the open loop enrichment mode. Control then determines in steps 214 and 216 if a condition occurs to exit the open loop enrichment mode.

At step 214, control determines if the downstream O2 sensor voltage has exceeded a calibratable predetermined threshold. In one example, lower voltage readings indicate the TWC 152 is saturated with oxygen, while higher voltage readings indicate lower oxygen content in the TWC 152. If the determined O2 sensor voltage exceeds the predetermined threshold, control proceeds to step 218. If not, control remains in the open loop enrichment mode and proceeds to step 216.

At step 216, control determines if the accumulated flow FL1 has exceeded a calibratable predetermined threshold. For example, this threshold may indicate stored oxygen levels in the catalyst have likely dropped to a desirable level (e.g., based on modeling). If the accumulated flow FL1 is below the predetermined threshold, control returns to step 214. If the accumulated flow FL1 meets or exceeds the predetermined threshold, control proceeds to step 218.

At step 218, control stops the open loop compensation and enters the closed loop enrichment mode for the closed loop extended fueling EN2. At step 220, control determines and applies a targeted level of fuel enrichment to the TWC 152 to react with the remaining excess O2 accumulated/stored in the TWC 152 during the FSO event. The closed loop extended fueling EN2 enrichment amount is based on the Integrated DFSO gas flow determined in step 204. In one example, the closed loop fuel enrichment is a calibrated predetermined air/fuel ratio target determined from another lookup table (e.g., stored in controller 164) based on modeling for a specific catalyst. The fueling may then be corrected and controlled to the target via feedback from the upstream O2 sensor 160.

At step 222, control determines the accumulated airflow FL2 passing through the TWC 152 during the closed loop enrichment mode, for example, via downstream O2 sensor 162 and the model. At step 224, control ceases the fuel enrichment event based on the threshold flow response. For example, controller 164 ceases the fuel enrichment event when the accumulated gas flow through the TWC 152 during the closed loop fuel enrichment meets or exceeds a predetermined threshold.

Figure 3:
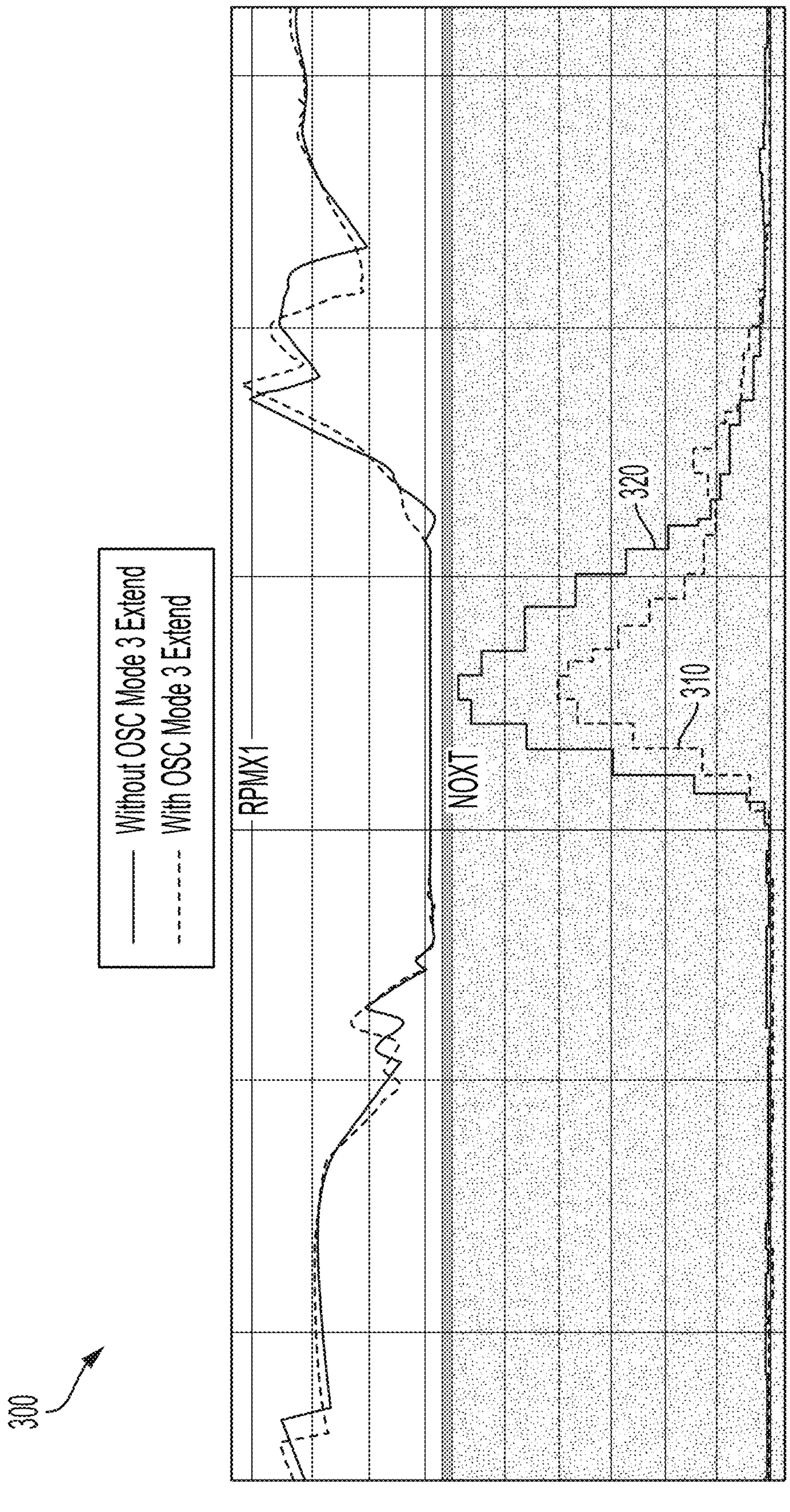
FIG. 3 illustrates an example plot of engine RPM and NOx emissions with and without an extended closed loop enrichment, in accordance with the principles of the present application.

Accordingly, as shown in the example graph 300 of FIG. 3, the method 200 of reducing fuel cut enrichment NOx emissions described above provides reduced NOx emissions (line 310) compared to a conventional fuel cut enrichment operation NOx emissions (line 320) without the extended closed loop enrichment.

Described herein are systems and methods for reducing NOx emissions during a fuel enrichment event that occurs in response to a FSO event. The system initiates a first mode with open loop enrichment having an enriched air/fuel ratio to reduce excess oxygen stored in the catalyst. Once conditions are met, the system then transitions into a second mode with closed loop enrichment having a targeted enriched air/fuel ratio for a predetermined duration to reduce excess oxygen in the downstream catalyst brick to bring the catalyst back to optimal conversion efficiency. As such, the system produces reduced NOx emissions during fuel cut followed by enrichment without eliminating fuel cuts.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A control system for an engine of a vehicle, the control system comprising:

one or more oxygen (O2) sensors disposed proximate to a three-way catalytic converter (TWC) in an exhaust system of the vehicle, the one or more O2 sensors each being configured to measure an O2 level of exhaust gas produced by the engine; and a controller in signal communication with the one or more O2 sensors and programmed to:

detect a fuel shut-off (FSO) event where the engine ceases providing fuel to the engine;

determine an accumulated gas flow through the TWC during the FSO event;

determine the FSO event has ended;

initiate an open loop fuel enrichment mode where the engine is supplied with a first fuel enrichment level having a first rich fuel/air ratio; and subsequently initiate a closed loop fuel enrichment mode where the engine is supplied with a second fuel enrichment level having a second rich fuel/air ratio, to thereby reduce NOx emissions, wherein the first and second fuel enrichment levels are based on the determined accumulated gas flow through the TWC during the FSO event, and wherein the controller is configured to transition from the open loop fuel enrichment mode to the closed loop fuel enrichment mode when (i) a voltage of the one or more O2 sensors exceeds a predetermined threshold voltage or (ii) an accumulated gas flow through the TWC during the open loop fuel enrichment mode has exceeded a predetermined flow threshold.

2. The control system of claim 1, wherein the first rich fuel/air ratio is a set value, and wherein the second rich fuel/air ratio is adjusted to maintain a target fuel/air ratio.

3. The control system of claim 1, wherein the at least one O2 sensor includes a first O2 sensor and a second O2 sensor.

4. The control system of claim 3, wherein the TWC includes a first catalyst disposed upstream of a second catalyst, and wherein the first O2 sensor is disposed upstream of the first catalyst, and the second O2 sensor is disposed downstream of the first catalyst and upstream of the second catalyst.

5. The control system of claim 1, wherein the controller is further programmed to determine the first fuel enrichment level based on a lookup table of varying fuel enrichment levels as a function of the determined accumulated gas flow through the TWC during the FSO event.

6. The control system of claim 1, wherein the controller is further programmed to determine the second fuel enrichment level based on a lookup table of enriched target fuel/air ratio as a function of the determined accumulated gas flow through the TWC during the FSO event.

7. The control system of claim 1, wherein the predetermined flow threshold is based on the TWC being fully saturated with oxygen from the FSO event.

8. The control system of claim 1, wherein the controller is further programmed to cease the closed loop fuel enrichment mode when a gas flow through the TWC during the closed loop fuel enrichment mode meets or exceeds a flow threshold.

9. A method of performing a fuel enrichment event for an engine of a vehicle to reduce NOx emissions, the method comprising:

providing a controller in signal communication with one or more oxygen (O2) sensors disposed proximate to a three-way catalytic converter (TWC) in an exhaust system of the vehicle, the one or more O2 sensors each being configured to measure an O2 level of exhaust gas produced by the engine;

detecting, by the controller, a fuel shut-off (FSO) event where the engine ceases providing fuel to the engine;

determining, by the controller, an accumulated gas flow through the TWC during the FSO event;

determining, by the controller, the FSO event has ended;

initiating, by the controller, an open loop fuel enrichment mode where the engine is supplied with a first fuel enrichment level having a first rich fuel/air ratio; and subsequently initiating a closed loop fuel enrichment mode where the engine is supplied with a second fuel enrichment level having a second rich fuel/air ratio, to thereby reduce NOx emissions, wherein the first and second fuel enrichment levels are based on the determined accumulated gas flow through the TWC during the FSO event, and wherein the controller is configured to transition from the open loop fuel enrichment mode to the closed loop fuel enrichment mode when (i) a voltage of the one or more O2 sensors exceeds a predetermined threshold voltage or (ii) an accumulated gas flow through the TWC during the open loop fuel enrichment mode has exceeded a predetermined flow threshold.

10. The method of claim 9, wherein the first rich fuel/air ratio is a set value, and wherein the second rich fuel/air ratio is adjusted to maintain a target fuel/air ratio.

11. The method of claim 9, wherein the at least one O2 sensor includes a first O2 sensor and a second O2 sensor.

12. The method of claim 11, wherein the TWC includes a first catalyst disposed upstream of a second catalyst, and wherein the first O2 sensor is disposed upstream of the first catalyst, and the second O2 sensor is disposed downstream of the first catalyst and upstream of the second catalyst.

13. The method of claim 9, further comprising determining, by the controller, the first fuel enrichment level based on a lookup table of varying fuel enrichment levels as a function of the determined accumulated gas flow through the TWC during the FSO event.

14. The method of claim 9, further comprising determining, by the controller, the second fuel enrichment level based on a lookup table of enriched target fuel/air ratio as a function of the determined accumulated gas flow through the TWC during the FSO event.

15. The method of claim 9, wherein the predetermined flow threshold is based on the TWC being fully saturated with oxygen from the FSO event.

16. The method of claim 9, further comprising ceasing, by the controller, the closed loop fuel enrichment mode when a gas flow through the TWC during the closed loop fuel enrichment mode meets or exceeds a flow threshold.

17. The control system of claim 1, wherein the TWC is the only catalytic converter in the exhaust system.

* * * * *